United States Patent
Wan et al.

(10) Patent No.: US 10,763,661 B2
(45) Date of Patent: Sep. 1, 2020

(54) REVERSE CURRENT PROTECTION CIRCUIT FOR SWITCH CIRCUIT

(71) Applicant: NXP B.V., Eindhoven (NL)

(72) Inventors: Mingliang Wan, Shanghai (CN); Fu Chun Zhan, Shanghai (CN); Yuanwei Yang, Shanghai (CN)

(73) Assignee: NXP B.V., Eindhoven (NL)

( * ) Notice: Subject to any disclaimer, the term of this patent is extended or adjusted under 35 U.S.C. 154(b) by 309 days.

(21) Appl. No.: 15/703,999

(22) Filed: Sep. 14, 2017

(65) Prior Publication Data

US 2018/0102636 A1 Apr. 12, 2018

(30) Foreign Application Priority Data

Oct. 10, 2016 (CN) .......................... 2016 1 0884118

(51) Int. Cl.
| | | |
|---|---|---|
| *H02H 3/18* | (2006.01) | |
| *H02H 3/08* | (2006.01) | |
| *H02H 11/00* | (2006.01) | |
| *H02H 3/00* | (2006.01) | |

(52) U.S. Cl.
CPC .............. *H02H 3/18* (2013.01); *H02H 3/003* (2013.01); *H02H 3/081* (2013.01); *H02H 11/003* (2013.01)

(58) Field of Classification Search
CPC .......... H02H 3/18; H02H 3/003; H02H 3/081; H02H 11/003
See application file for complete search history.

(56) References Cited

U.S. PATENT DOCUMENTS

| | | | |
|---|---|---|---|
| 7,859,240 B1 | 12/2010 | Geynet et al. | |
| 9,077,190 B2 * | 7/2015 | Posat | H03K 17/0822 |
| 9,236,375 B2 | 1/2016 | Sun | |
| 2004/0263127 A1* | 12/2004 | Turner | H01M 10/42 |
| | | | 320/166 |
| 2008/0054721 A1* | 3/2008 | Frew | H02J 1/10 |
| | | | 307/52 |
| 2009/0160532 A1* | 6/2009 | Wu | H02M 3/073 |
| | | | 327/536 |

* cited by examiner

Primary Examiner — Pete T Lee

(57) ABSTRACT

A reverse current protection circuit for a switch circuit includes a reverse current control circuit and an enable/disable circuit coupled to the reverse current control circuit. The reverse current control circuit is coupled to an input terminal and an output terminal of the switch circuit, and disconnects the output terminal of the switch circuit from the input terminal of the switch circuit when an output voltage of the switch circuit is higher than a first predetermined voltage. The enable/disable circuit disables the reverse current control circuit for a first predetermined time period when the output voltage of the switch circuit becomes lower than the first predetermined voltage after being higher than the first predetermined voltage, and enables the reverse current control circuit after the first predetermined time period.

14 Claims, 6 Drawing Sheets

REVERSE CURRENT PROTECTION CIRCUIT FOR SWITCH CIRCUIT

BACKGROUND

The present invention is directed to a reverse current protection circuit and, more particularly, to a reverse current protection circuit capable of protecting a switch circuit from reverse current damage.

Generally, reverse currents are generated in a device when a voltage at an output terminal of the device is higher than a voltage at an input terminal of the device. The reverse currents flow back from the output terminal to the input terminal, which may decrease performance or even damage the device. Therefore, many devices have reverse current protection circuitry.

In a switch circuit, a conventional reverse current protection circuit sets a voltage reference that is equal to the voltage at the input terminal of the switch circuit. When the voltage at the output terminal of the switch circuit is higher than the voltage reference, the conventional reverse current protection circuit generates a RCP (reverse current protection) signal to disconnect the output terminal of the switch circuit from the input terminal of the switch circuit. However, since the voltage reference generally has a certain fluctuation range, reverse currents may have already occurred when the voltage at the output terminal of the switch circuit is higher than the voltage reference. Thus the conventional reverse current protection circuit does not provide the switch circuit with timely and effective protection from reverse currents.

Setting the voltage reference to be lower than the voltage at the input terminal of the switch circuit causes a different problem. When the switch circuit starts up or a load on the switch circuit changes, an overshoot voltage occurs at the output terminal of the switch circuit. Generally, the overshoot voltage is a ripple voltage, and a level of the ripple voltage gradually decreases. When the conventional reverse current protection circuit disconnects the output terminal of the switch circuit from the input terminal of the switch circuit, the overshoot voltage is pulled down to a very low level. When the output voltage is pulled down to be lower than a predetermined level, the input terminal and the output terminal of the switch circuit reconnect. Then, the ripple voltage occurs again at the output terminal of the switch circuit and rapidly rises up to an original level of the overshoot voltage occurring when the switch circuit starts up or the load of the switch circuit changes, and the reverse current protection circuit causes the overshoot voltage to be pulled down to a very low level again. Thus, the conventional reverse current protection circuit causes the output voltage of the switch circuit to be very unstable during start-up and load changes.

Accordingly, it is desired to have a reverse current protection circuit that can both make the output voltage of the switch circuit more stable and protect the switch circuit from reverse current damage during start-up and load changes.

SUMMARY

A reverse current protection circuit and a switch circuit with the reverse current protection circuit are described herein.

The reverse current protection circuit includes a reverse current control circuit that is coupled to an input terminal and an output terminal of the switch circuit. The reverse current control circuit disconnects the output terminal from the input terminal when an output voltage of the switch circuit is higher than a first predetermined voltage.

The reverse current protection circuit also includes an enable/disable circuit that is coupled to the reverse current control circuit. The enable/disable circuit disables the reverse current control circuit for a first predetermined time period when the output voltage of the switch circuit becomes lower than the first predetermined voltage after being higher than the first predetermined voltage, and enables the reverse current control circuit after the first predetermined time period.

In one embodiment, the switch circuit includes the reverse current protection circuit and a voltage regulator circuit. The voltage regulator circuit is coupled between the input and output terminals of the switch circuit, and coupled to the reverse current control circuit. When the output voltage of the switch circuit is equal to or lower than the first predetermined voltage, the voltage regulator regulates the output voltage of the switch circuit to be equal to or lower than a second predetermined voltage.

The above features, and other features and advantages will be readily apparent from the following detailed description when taken in connection with the accompanying drawings.

BRIEF DESCRIPTION OF THE DRAWINGS

The present invention is illustrated by way of example and is not limited by embodiments thereof shown in the accompanying figures, in which like references indicate similar elements. Elements in the figures are illustrated for simplicity and clarity and have not necessarily been drawn to scale.

DETAILED DESCRIPTION

Figure 1:
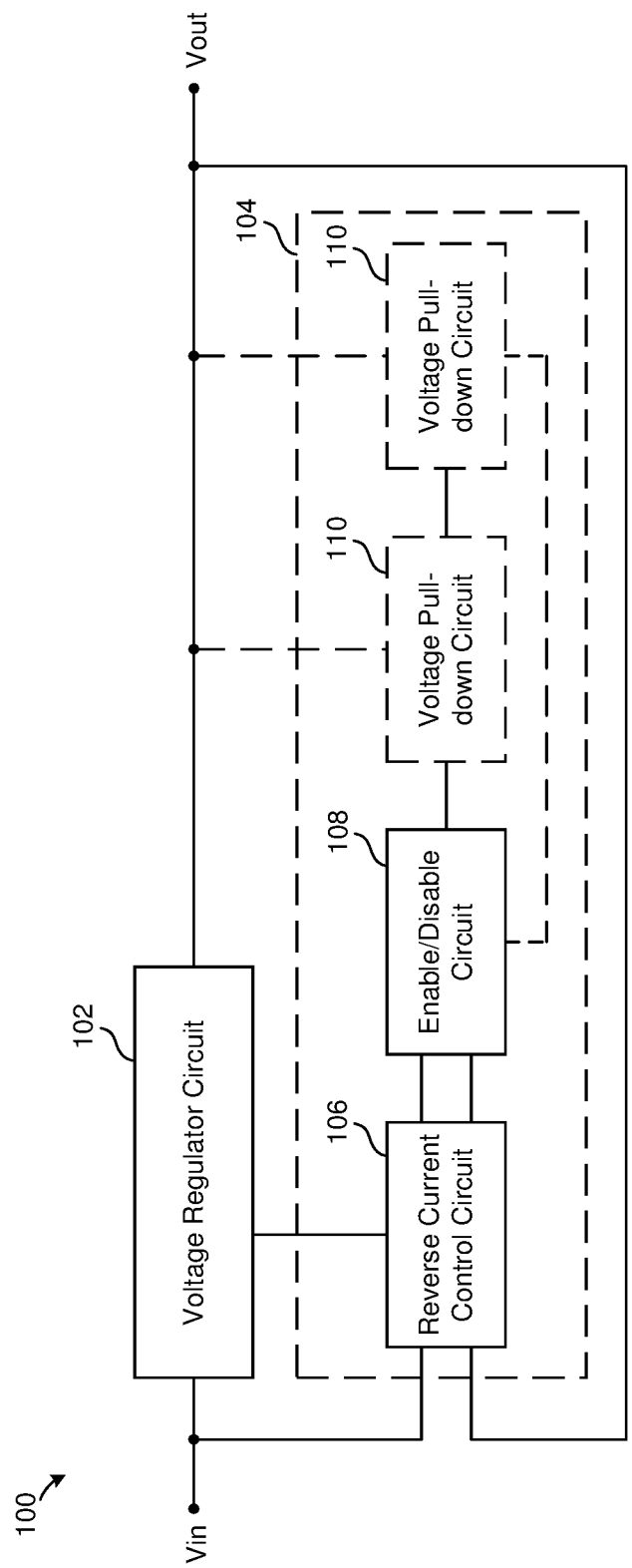
FIG. 1 is a schematic block diagram of a switch circuit with a reverse current protection circuit in accordance with an exemplary embodiment.

FIG. 1 is a schematic block diagram of a switch circuit 100 in accordance with an exemplary embodiment of the present invention. The switch circuit 100 includes a voltage regulator circuit 102. The voltage regulator circuit 102 is coupled between an input terminal and an output terminal of the switch circuit 100. When an output voltage Vout at the output terminal of the switch circuit 100 is equal to or lower than a first predetermined voltage Vref_a, the input terminal of the switch circuit 100 is connected to the output terminal, and the voltage regulator circuit regulates the output voltage Vout to be equal to or lower than a second predetermined voltage Vref_b.

The switch circuit 100 also includes a reverse current protection circuit 104. The reverse current protection circuit 104 includes a reverse current control circuit 106. The reverse current control circuit 106 is coupled to the input and output terminals of the switch circuit 100. When the output voltage Vout is higher than the first predetermined voltage Vref_a, the reverse current control circuit 106 disconnects the output terminal from the input terminal to prevent a reverse current from flowing into the input terminal and damaging the switch circuit 100.

In an exemplary embodiment, the voltage regulator circuit 102 includes a transistor (not shown in FIG. 1) coupled to the reverse current control circuit 106. When the output voltage Vout is higher than the first predetermined voltage Vref_a, the reverse current control circuit 106 disconnects the output terminal from the input terminal by controlling the transistor in order to protect the switch circuit 100 from reverse currents.

The reverse current protection circuit 104 also includes an enable/disable circuit 108, which is coupled to the reverse current control circuit 106. The enable/disable circuit 108 disables the reverse current control circuit 106 for a first predetermined time period t1 from when (or after) the output voltage Vout of the switch circuit 100 becomes lower than the first predetermined voltage Vref_a after being higher than the first predetermined voltage Vref_a, and enables the reverse current control circuit 106 after the first predetermined time period t1.

The reverse current protection circuit 104 also may include one or a plurality of voltage pull-down circuits 110 (two of which are shown in FIG. 1). In an exemplary embodiment including one voltage pull-down circuit 110, the voltage pull-down circuit 110 is coupled to the enable/disable circuit 108 and the output terminal of the switch circuit 100. The voltage pull-down circuit 110 pulls down the output voltage Vout in order to accelerate a drop of the output voltage Vout when the reverse current control circuit 106 disconnects the input and output terminals of the switch circuit 100, and stops pulling down the output voltage Vout when the first predetermined time period t1 ends.

In an exemplary embodiment including a plurality of voltage pull-down circuits 110, the plurality of voltage pull-down circuits 110 are connected in parallel with each other. Each of the voltage pull-down circuits 110 is coupled to the enable/disable circuit 108 and the output terminal of the switch circuit 100. Each of voltage pull-down circuits 110 pulls down the output voltage Vout when the reverse current control circuit 106 disconnects the input and output terminals, and stops pulling down the output voltage Vout at a certain time interval, in sequence, during a second predetermined time period t2 after the first predetermined time period t1.

Figure 2:
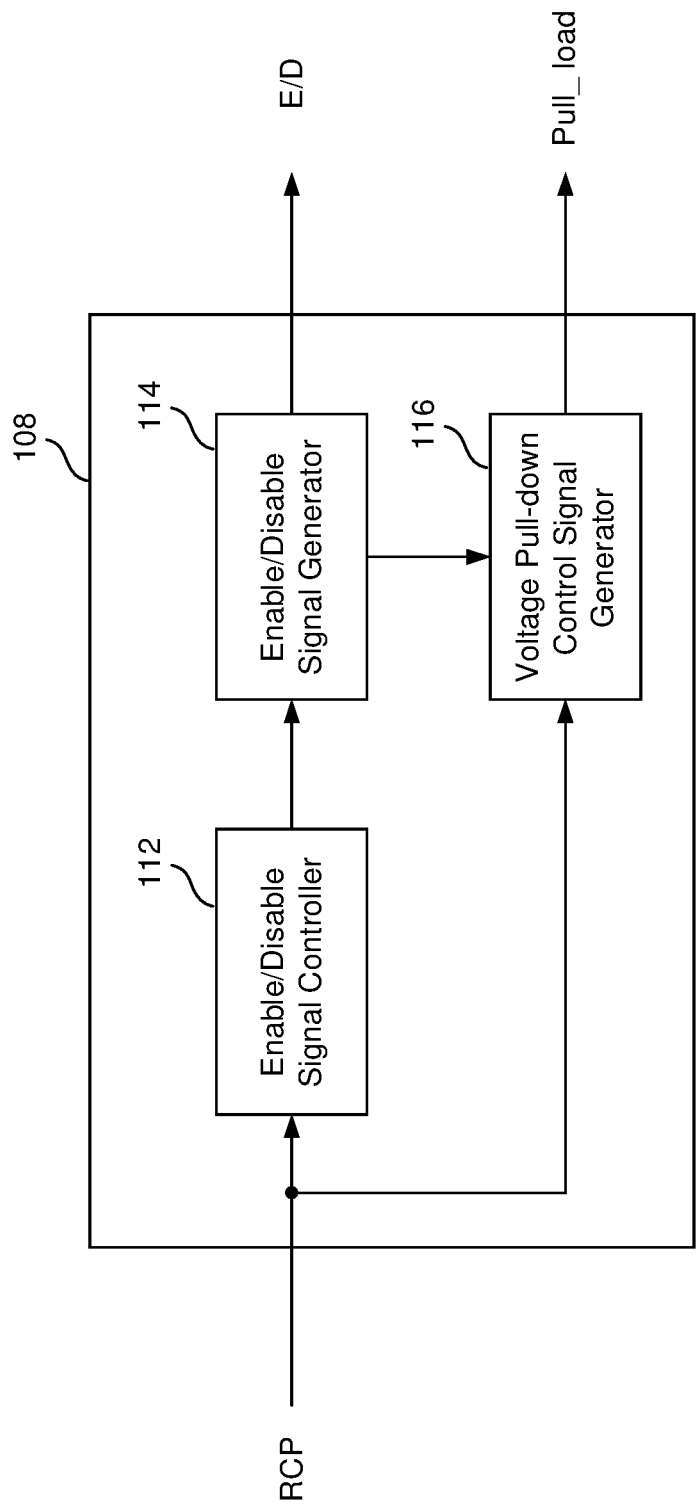
FIG. 2 is a schematic block diagram of an enable/disable circuit of the reverse current protection circuit of FIG. 1 in accordance with an exemplary embodiment.

FIG. 2 is a schematic block diagram of the enable/disable circuit 108 of the reverse current protection circuit 104 in accordance with an exemplary embodiment. The enable/disable circuit 108 includes an enable/disable signal controller 112 that is coupled to the reverse current control circuit 106. The enable/disable signal controller 112 outputs a disable control signal when the output voltage Vout of the switch circuit 100 becomes lower than the first predetermined voltage Vref_a after being higher than the first predetermined voltage Vref_a.

The enable/disable circuit 108 also includes an enable/disable signal generator 114 that is coupled to the enable/disable signal controller 112 and the reverse current control circuit 106. In response to the disable control signal received from the enable/disable signal controller 112, the enable/disable signal generator 114 generates an enable/disable (E/D) signal and outputs the E/D signal to the reverse current control circuit 106. The enable/disable signal is used for disabling the reverse current control circuit 106 for the first predetermined time period t1 and enabling the reverse current control circuit 106 after the first predetermined time period t1.

The enable/disable circuit 108 also includes a voltage pull-down control signal generator 116, which is coupled to the reverse current control circuit 106, the enable/disable signal generator 114, and the voltage pull-down circuit 110. The voltage pull-down signal generator 116 will be discussed in more detail below with reference to FIGS. 3, 5 and 6.

Hereinafter, operation of the switch circuit 100 of FIG. 1 will be described in detail with reference to FIGS. 3-6.

Figure 3:
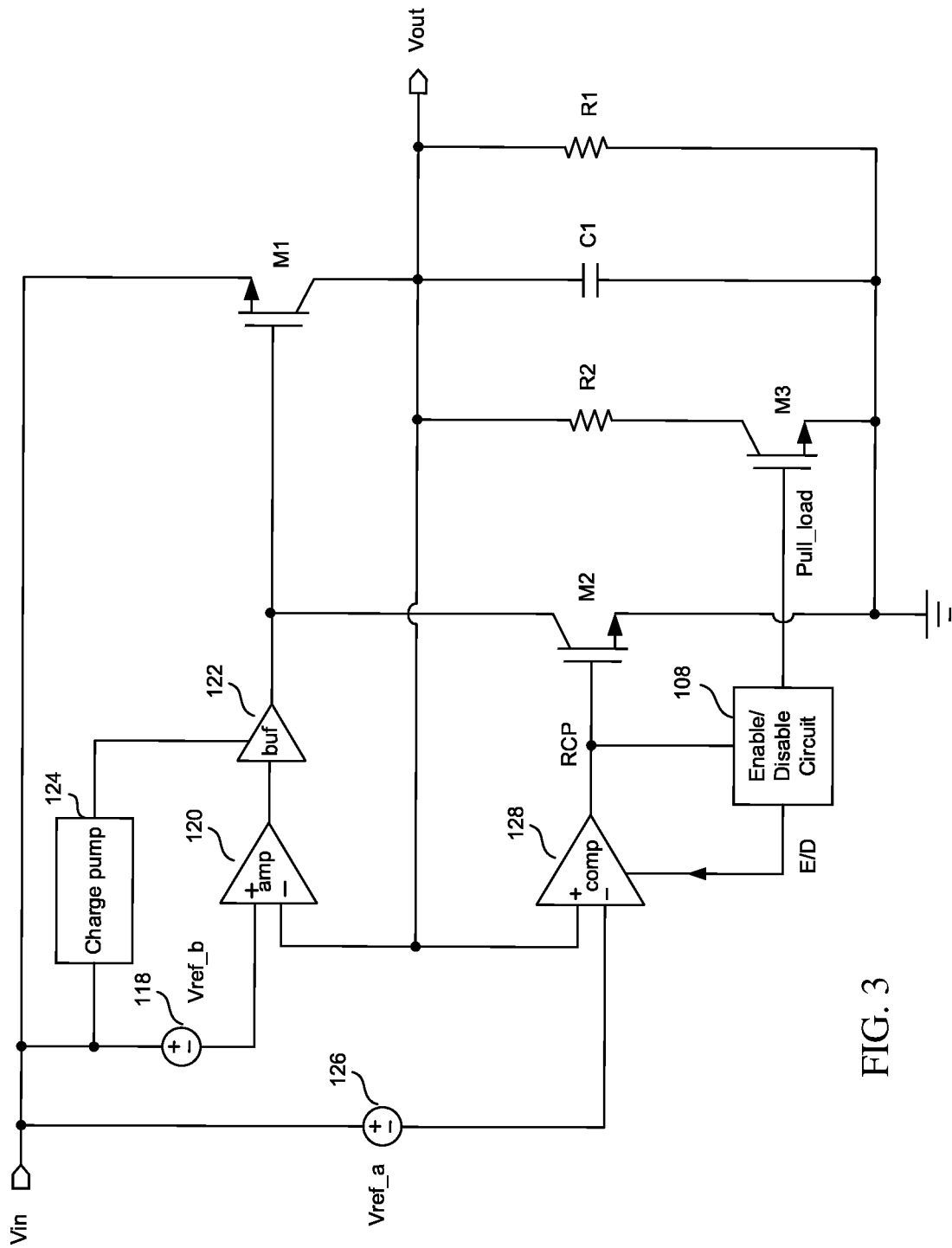
FIG. 3 is a schematic circuit diagram of the switch circuit of FIG. 1 in accordance with an exemplary embodiment.

FIG. 3 is a schematic circuit diagram of the switch circuit 100 of FIG. 1 in accordance with an exemplary embodiment. In the exemplary embodiment, the switch circuit 100 is a power switch circuit. In FIG. 3, the voltage regulator circuit 102 is implemented using a conventional low dropout regulator (LDO), which includes a voltage reference 118, an amplifier 120, a buffer 122, a charge pump 124, a transistor M1, a capacitor C1 and a load R1. The transistor M1 may be a power MOST having a drain terminal that can endure a high voltage so that it will not be damaged when the output voltage Vout of the switch circuit 100 is high.

Figure 4:
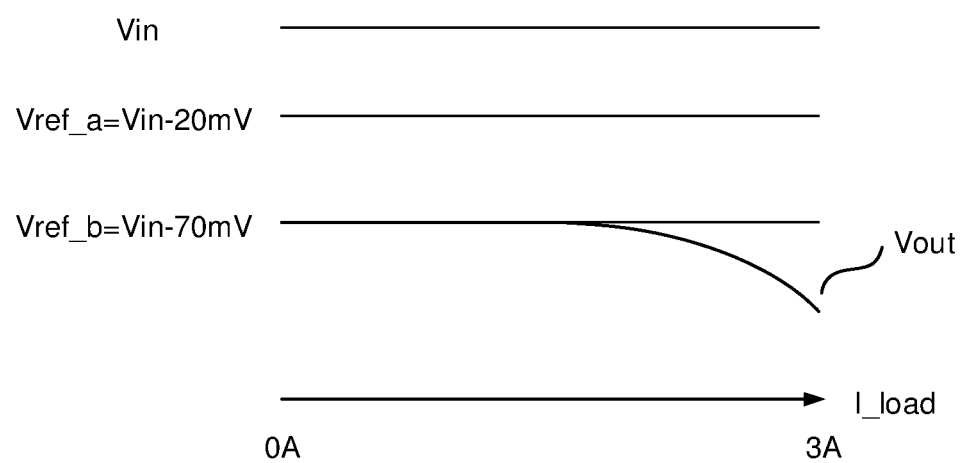
FIG. 4 is a graph illustrating changes of the output voltage Vout of the switch circuit of FIG. 1 along with a load current I_load during operation of a voltage regulator circuit of the switch circuit.

FIG. 4 is a graph illustrating changes of the output voltage Vout of the switch circuit 100 along with a load current I_load during operation of the voltage regulator circuit 102. In other words, FIG. 4 shows changes of the output voltage Vout of the switch circuit 100 along with the load current I_load when the output voltage Vout of the switch circuit 100 is lower than a first predetermined voltage Vref_a. During a light load current condition, the amplifier 120 controls an output of the buffer 122 to regulate a gate voltage of the transistor M1 to stabilize the output voltage Vout of the switch circuit 100 at the second predetermined voltage Vref_b provided by the voltage reference 118. During a heavy load current condition, the gate voltage of the transistor M1, controlled by the buffer 122, reaches a fixed upper limit to fully turn on the transistor M1 and to operate in a linear region, and the load R1 draws current from the output terminal of the switch circuit 100, thereby causing the output voltage Vout of the switch circuit 100 to drop to be lower than the second predetermined voltage Vref_b. Further, the charge pump 124 boosts the buffer 122 to drive the transistor M1 to work in an ultra-low ohmic region to reduce power loss and improve power efficiency during heavy load current condition.

The reverse current control circuit 106 (FIG. 1) includes a voltage reference 126, a comparator 128 and a transistor M2. The voltage reference 126 is coupled between the input terminal of the switch circuit 100 and a first input terminal of the comparator 128. A second input terminal of the comparator 128 is coupled to the output terminal of the switch circuit 100, and an output terminal of the comparator 128 is coupled to a gate terminal of the transistor M2. The comparator 128 thus receives the regulated input voltage (Vref_a) and the output voltage (Vout) and generates a reverse current protection (RCP) signal. A drain terminal of the transistor M2 is coupled to the gate terminal of the transistor M1, and a source terminal of the transistor M2 is coupled to ground.

Figure 5:
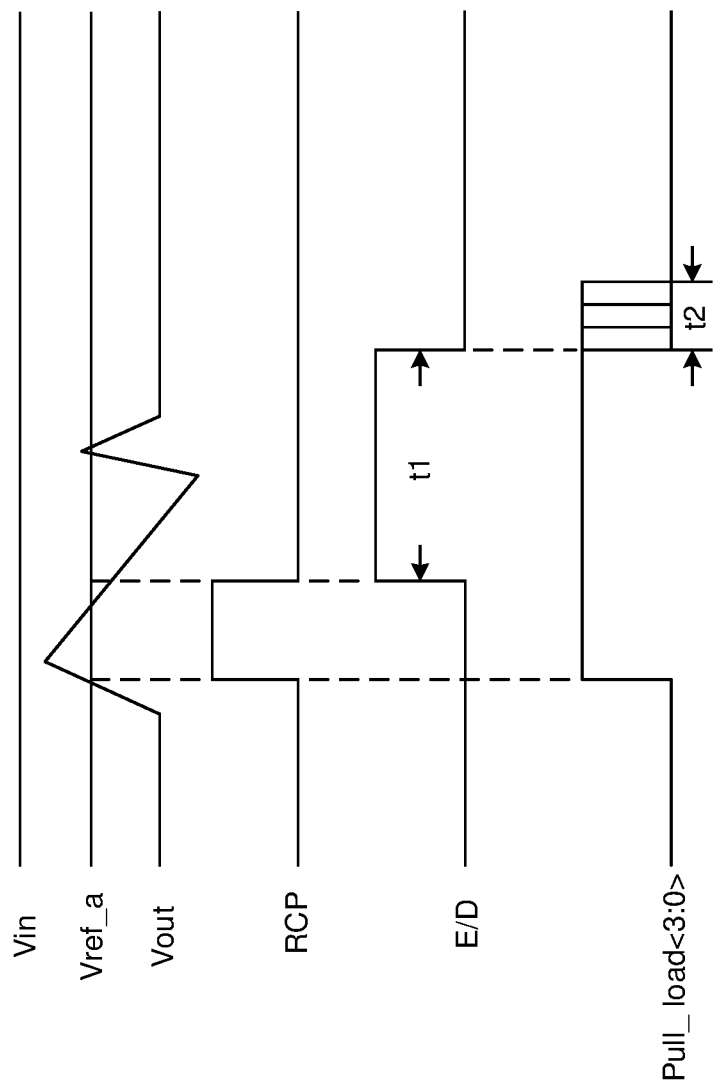
FIG. 5 is graph illustrating changes of a reverse current protection (RCP) signal, an enable/disable (E/D) signal and a pull load (Pull_load) signal over time in accordance with an exemplary embodiment.

When the output voltage Vout is higher than the first predetermined voltage Vref_a of the voltage reference 126, the RCP signal output by the comparator 128 goes from low to high, as shown in FIG. 5. The RCP signal with high level turns on the transistor M2 and the gate voltage of the transistor M1 is pulled down, which turns off the transistor M1. In this way, a reverse current is prevented from flowing from the output terminal to the input terminal of the switch circuit 100 through the transistor M1, thereby protecting the switch circuit 100 from reverse currents.

As shown in FIG. 5, the output voltage Vout of the switch circuit 100 drops when the RCP signal is high because the capacitor C1 discharges to the load R1 and the load R1 draws currents from the output terminal of the switch circuit 100. After the output voltage Vout becomes lower than the first predetermined voltage Vref_a, the RCP signal goes from high to low, which turns off the transistor M2 and the gate voltage of the transistor M1 rises. The enable/disable signal controller 112 detects if the RCP signal becomes low from high. The RCP signal goes from high to low when (or after) the output voltage Vout of the switch circuit 100 becomes lower than the first predetermined voltage Vref_a after being higher than the first predetermined voltage Vref_a. In FIG. 5, the RCP signal does not go from high to low at the time that the output voltage Vout of the switch circuit 100 becomes lower than the first predetermined voltage Vref_a because the comparator 128 has a hysteresis design. If the comparator 128 did not have a hysteresis design, the RCP signal would go low when the output voltage Vout becomes lower than the first predetermined voltage Vref_a. When the enable/disable signal controller 112 detects the RCP signal goes from high to low, the enable/disable signal controller 112 outputs the disable control signal to the enable/disable signal generator 114. Then the enable/disable signal generator 114 outputs to the comparator 128 the E/D signal, which is high for the first predetermined time period t1 and goes low after the first predetermined time period t1. A high E/D signal disables the comparator 128. That is to say, the comparator 128 turns off and maintains the RCP signal at the low level for the first predetermined time period t1. When the first predetermined time period t1 ends, the E/D signal goes low and the comparator 128 is enabled. In other words, if the comparator 128 does not have a hysteresis design, the enable/disable circuit 108 disables the reverse current control circuit 106 for the first predetermined time period t1 when the output voltage Vout of the switch circuit 100 becomes lower than the first predetermined voltage Vref_a after being higher than the first predetermined voltage Vref_a. If the comparator 128 has a hysteresis design, the enable/disable circuit 108 disables the reverse current control circuit 106 for the first predetermined time period t1 after the output voltage Vout of the switch circuit 100 becomes lower than the first predetermined voltage Vref_a after being higher than the first predetermined voltage Vref_a.

In a presently preferred embodiment, the enable/disable circuit 108 also includes the voltage pull-down control signal generator 116, which is coupled to the voltage pull-down circuit 110. The voltage pull-down circuit 110 includes a resistor R2 and a transistor M3. The resistor R2 is coupled between the output terminal of the switch circuit 100 and a drain terminal of the transistor M3, a gate terminal of the transistor M3 is coupled to the voltage pull-down control signal generator 116, and a source terminal of the transistor M3 is coupled to ground.

The voltage pull-down control signal generator 116 outputs the voltage pull-down control (Pull_load) signal to the gate terminal of the transistor M3. When the RCP signal goes high, the Pull_load signal goes from low to high, which turns on the transistor M3 and current is pulled from the output terminal of the switch circuit 100, thereby pulling the output voltage Vout down. The voltage pull-down control signal generator 116 keeps the Pull_load signal high until or after the first predetermined time period t1 ends.

Figure 6:
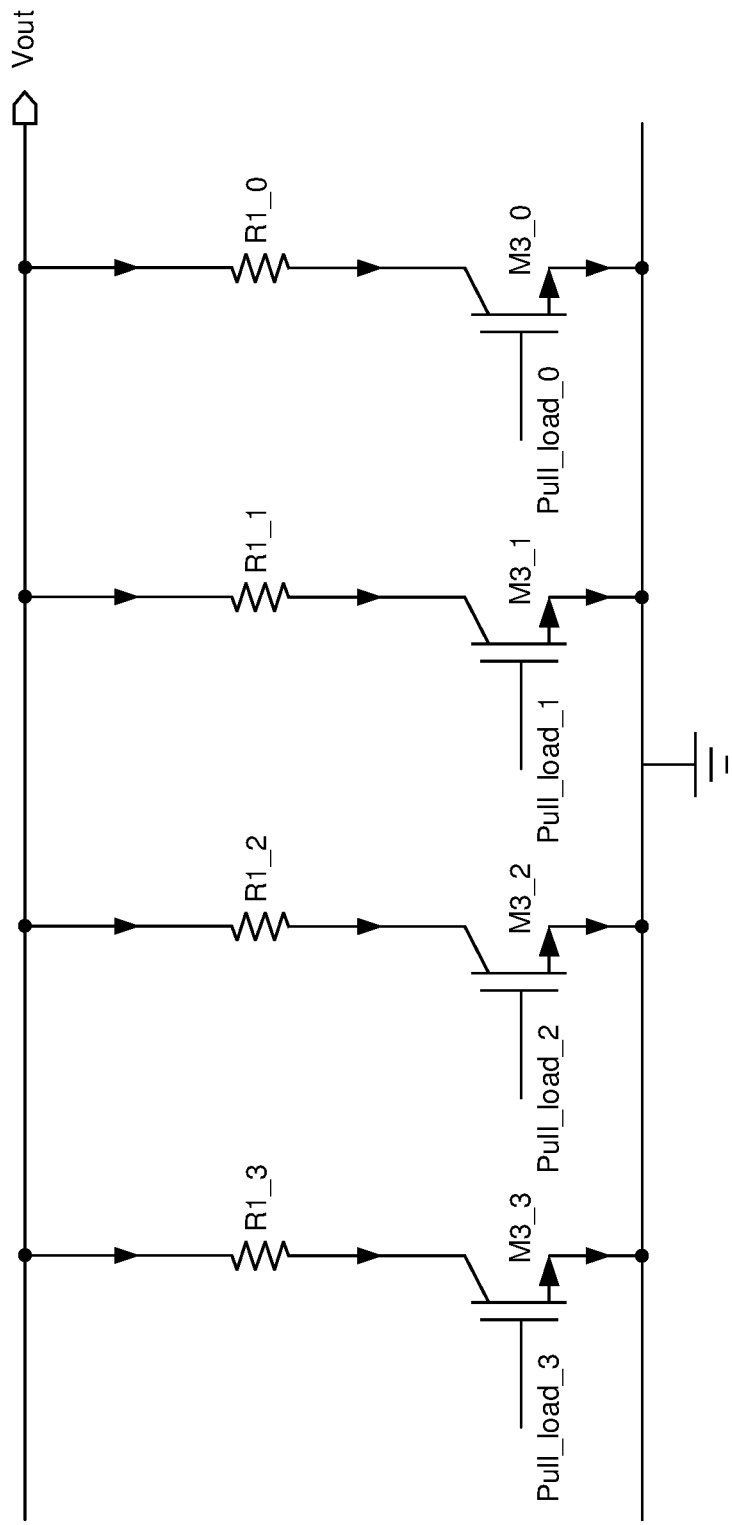
FIG. 6 is a schematic circuit diagram of a voltage pull-down circuit of the reverse current protection circuit of FIG. 1 in accordance with another exemplary embodiment.

In another exemplary embodiment shown in FIG. 6, the reverse current protection circuit 104 includes four voltage pull-down circuits 110 connected in parallel. In this embodiment, the voltage pull-down control signal generator 116 outputs four Pull_load signals (Pull_load_0, Pull_load_1, Pull_load_2, Pull_load_3) to these four voltage pull-down circuits 110. When the RCP signal goes from low to high, the four Pull_load signals go from low to high. The voltage pull-down control signal generator 116 causes the four Pull_load signals to go from high to low sequentially at a certain time interval during the second predetermined time period t2 after the first predetermined time period t1. In this way, the voltage pull-down circuits 110 stop pulling down the output voltage Vout at a certain time interval in sequence during the second predetermined time period t2. If all of the voltage pull-down circuits 110 stop pulling down the output voltage Vout at the end of the first predetermined time period t1, currents flowing through the transistor M1 would charge the capacitor C1 rapidly, causing a voltage of the capacitor C1 to rise rapidly, in turn the output voltage Vout of the switch circuit 100 could exceed the first predetermined voltage Vref_a due to the rapid rise of the voltage of the capacitor C1. However, this issue is avoided by making a plurality of voltage pull-down circuits 110 stop pulling down the output voltage Vout at a certain time interval in sequence during the second predetermined time period t2.

The enable/disable signal controller 112, enable/disable signal generator 114, and the voltage pull-down control signal generator 116 may be implemented with common digital logical circuits, which are known by those of skill in the art. For example, the voltage pull-down control signal generator 116 may be implemented with an AND gate.

As shown in FIG. 4, the first predetermined voltage Vref_a is lower than the input voltage Vin of the switch circuit 100. The reverse current control circuit 106 can be tweaked to take action in advance by setting the first predetermined voltage Vref_a to be lower than the input voltage Vin, thereby providing better protection for the switch circuit 100 against reverse currents. The second predetermined voltage Vref_b is lower than the first predetermined voltage Vref_a, causing the switch circuit 100 to operate at more securely. In an exemplary embodiment, the first predetermined voltage Vref_a is 20 mV lower than the input voltage Vin, and the second predetermined voltage Vref_b is 70 mV lower than Vin.

In the present invention, during the first predetermined time period t1, since the output voltage Vout of the switch circuit 100 is a ripple voltage and a level of the ripple voltage gradually decreases, the reverse current control circuit 106 does not disconnect the output terminal from the input terminal of the switch circuit 100 even if the output voltage Vout is higher than the first predetermined voltage Vref_a, and the voltage regulator circuit 102 regulates the output voltage Vout. With respect to the above-mentioned issue of the output voltage Vout being unstable when using the conventional reverse current protection circuit, the present invention provides a stable output voltage Vout during start-up and load changes of the switch circuit, and at the same time, the prevent invention provides timely and effective protection for the switch circuit from reverse currents. The prevent invention provides timely and effective protection for the switch circuit from reverse currents.

In the foregoing specification, the invention has been described with reference to specific examples of embodiments of the invention. It will, however, be evident that various modifications and changes may be made therein without departing from the broader spirit and scope of the invention as set forth in the appended claims.

In the claims, the words 'comprising' and 'having' do not exclude the presence of other elements or steps then those listed in a claim. The terms "a" or "an," as used herein, are defined as one or more than one. Also, the use of introductory phrases such as "at least one" and "one or more" in the claims should not be construed to imply that the introduction of another claim element by the indefinite articles "a" or "an" limits any particular claim containing such introduced claim element to inventions containing only one such element, even when the same claim includes the introductory phrases "one or more" or "at least one" and indefinite articles such as "a" or "an." The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The fact that certain measures are recited in mutually different claims does not indicate that a combination of these measures cannot be used to advantage.

The invention claimed is:

1. A reverse current protection circuit for a switch circuit, comprising:
   a reverse current control circuit, coupled to an input terminal and an output terminal of the switch circuit,
   wherein the reverse current control circuit disconnects the output terminal from the input terminal when an output voltage of the switch circuit is higher than a first predetermined voltage, and
   an enable/disable circuit, coupled to the reverse current control circuit, that
      disables the reverse current control circuit for a first predetermined time period when the output voltage of the switch circuit becomes lower than the first predetermined voltage after being higher than the first predetermined voltage, and
      enables the reverse current control circuit after the first predetermined time period; and
   a voltage pull-down circuit coupled to the enable/disable circuit and the output terminal of the switch circuit;
   wherein the voltage pull-down circuit,
      pulls down the output voltage of the switch circuit when the reverse current control circuit disconnects the input and output terminals of the switch circuit, and
      stops pulling down the output voltage of the switch circuit when the first predetermined time period ends.

2. The reverse current protection circuit of claim 1, wherein the enable/disable circuit comprises:
   a enable/disable signal controller, coupled to the reverse current control circuit, that outputs a disable control signal when the output voltage of the switch circuit becomes lower than the first predetermined voltage after being higher than the first predetermined voltage; and
   an enable/disable signal generator, coupled to the enable/disable signal controller and the reverse current control circuit, that generates an enable/disable signal for disabling the reverse current control circuit for the first predetermined time period and
   enabling the reverse current control circuit after the first predetermined time period in response to the disable control signal, and
   outputs the enable/disable signal to the reverse current control circuit.

3. The reverse current protection circuit of claim 1:
   wherein the voltage pull-down circuit comprises a resistor and a first transistor,
   wherein the resistor is coupled between the output terminal of the switch circuit and a first terminal of the first transistor, a second terminal of the first transistor is coupled to the enable/disable circuit, and a third terminal of the first transistor is coupled to ground.

4. The reverse current protection circuit of claim 1, further comprising:
   a plurality of voltage pull-down circuits connected in parallel,
   wherein each of the voltage pull-down circuits is coupled to the enable/disable circuit and the output terminal of the switch circuit, and
   each of voltage pull-down circuits
      pulls down the output voltage when the reverse current control circuit disconnects the input and output terminals of the switch circuit, and
      stops pulling down the output voltage at a certain time interval in sequence during a second predetermined time period after the first predetermined time period.

5. The reverse current protection circuit of claim 1, wherein the first predetermined voltage is lower than an input voltage of the switch circuit.

6. A switch circuit,
comprising a reverse current protection circuit as claimed in claim 1.

7. The switch circuit of claim 6,
further comprising a voltage regulator circuit, coupled between the input terminal and the output terminal of the switch circuit, and coupled to the reverse current control circuit,
wherein when the output voltage of the switch circuit is lower than the first predetermined voltage, the voltage regulator circuit regulates the output voltage of the switch circuit to be equal to or lower than a second predetermined voltage.

8. The switch circuit of claim 7, wherein:
the voltage regulator circuit includes a second transistor coupled to the reverse current control circuit,
the reverse current control circuit disconnects the output terminal of the switch circuit from the input terminal of the switch circuit by controlling the second transistor in order to protect the switch circuit from reverse currents.

9. The switch circuit of claim 7,
wherein the second predetermined voltage is lower than the first predetermined voltage.

10. The switch circuit of claim 6,
wherein the switch circuit is a power switch circuit.

11. A reverse current protection circuit for a switch circuit, comprising:
   a reverse current control circuit, coupled to an input terminal and an output terminal of the switch circuit;
   wherein the reverse current control circuit disconnects the output terminal from the input terminal when an output voltage of the switch circuit is higher than a first predetermined voltage;
   an enable/disable circuit, coupled to the reverse current control circuit, that
      disables the reverse current control circuit for a first predetermined time period when the output voltage of the switch circuit becomes lower than the first predetermined voltage after being higher than the first predetermined voltage; and
enables the reverse current control circuit after the first predetermined time period;
a plurality of voltage pull-down circuits connected in parallel;
wherein each of the voltage pull-down circuits is coupled to the enable/disable circuit and the output terminal of the switch circuit; and
each of voltage pull-down circuits,
pulls down the output voltage when the reverse current control circuit disconnects the input and output terminals of the switch circuit; and
stops pulling down the output voltage at a certain time interval in sequence during a second predetermined time period after the first predetermined time period.

12. A reverse current protection circuit for a switch circuit, comprising:
a reverse current control circuit, coupled to an input terminal and an output terminal of the switch circuit;
wherein the reverse current control circuit disconnects the output terminal from the input terminal when an output voltage of the switch circuit is higher than a first predetermined voltage;
an enable/disable circuit, coupled to the reverse current control circuit, that
disables the reverse current control circuit for a first predetermined time period when the output voltage of the switch circuit becomes lower than the first predetermined voltage after being higher than the first predetermined voltage; and
enables the reverse current control circuit after the first predetermined time period;
further comprising the switch circuit;
wherein the switch circuit includes the reverse current protection circuit;
wherein the switch circuit further includes,
a voltage regulator circuit, coupled between the input terminal and the output terminal of the switch circuit, and coupled to the reverse current control circuit;
wherein when the output voltage of the switch circuit is lower than the first predetermined voltage, the voltage regulator circuit regulates the output voltage of the switch circuit to be equal to or lower than a second predetermined voltage.

13. The switch circuit of claim 12, wherein:
the voltage regulator circuit includes a second transistor coupled to the reverse current control circuit,
the reverse current control circuit disconnects the output terminal of the switch circuit from the input terminal of the switch circuit by controlling the second transistor in order to protect the switch circuit from reverse currents.

14. The switch circuit of claim 12:
wherein the second predetermined voltage is lower than the first predetermined voltage.

* * * * *